Feb. 22, 1955

J. E. BRIDGES 2,702,875

DEFLECTION SYSTEM

Filed March 9, 1951

INVENTOR.
JACK E. BRIDGES
BY Francis W. Crotty
ATTORNEY 2,702,875
Patented Feb. 22, 1955

2,702,875

DEFLECTION SYSTEM

Jack E. Bridges, Chicago, Ill., assignor to Zenith Radio Corporation, a corporation of Illinois Application March 9, 1951, Serial No. 214,786

8 Claims. (Cl. 315—27)

This invention relates to television receivers and the like and more particularly to a novel deflection system for an image-reproducing device such as a cathode-ray tube.

In a conventional television receiver, of the type using a cathode-ray tube for image reproduction, video-signal components of a received composite television signal are employed to control the intensity of the electron beam of the cathode-ray tube, while synchronizing-signal components of the received composite television signal are used to control a pair of sweep-signal generators which impress deflection currents of generally sawtooth waveform on a pair of magnetic-deflection coils associated with the image-reproducing device. According to common practice, vertical deflection takes place at a relatively low field frequency while horizontal deflection occurs at a relatively high line frequency.

It is well known in the art that in order to obtain optimum picture fidelity the deflection currents applied to the respective magnetic-deflection coils must change linearly throughout each trace interval. On the other hand, many conventional sweep-signal generators are characterized by a substantial amount of non-linearity in the output current waveform. This effect is particularly troublesome in the line-frequency sweep system, resulting in a tendency to compress the right side of the reproduced image. It is known that compensation of this undesirable non-linearity may be obtained by means of a saturable reactor effectively connected in series with the deflection coil or yoke and having a premagnetized core so that its inductance decreases as the sweep-current increases toward the end of each trace interval with the result that the fraction of the total voltage developed which is applied to the deflection coil is increased. Various schemes have been proposed for providing the necessary premagnetization of the saturable reactor core, most of which have required the use of a choke or other means for separating the alternating-current and direct-current circuits.

It is further known to the art that the size of the reproduced image may be controlled by including a variable inductor either in series or in shunt with the magnetic-deflection coil. However, heretofore, size control and linearity control have always been accomplished by means of separate control devices.

It is an important object of the invention to provide a new and improved deflection circuit for a cathode-ray tube in which a single control device concomitantly controls linearization of the sweep current and size of the reproduced image.

It is a further object of the invention to provide a new and improved saturable reactor for use as a linearizing device in the deflection system associated with a cathode-ray tube.

In accordance with the invention, a deflection circuit for a cathode-ray tube comprises a magnetic-deflection coil responsive to an applied scanning current to deflect the electron beam of the cathode-ray tube in accordance with a predetermined scanning pattern. The sweep-signal generator is coupled to the deflection coil for applying thereto a periodic scanning current of generally sawtooth waveform. The system also includes a linearizing device comprising a high-permeability ferromagnetic core, a coil effectively connected in series with the magnetic-deflection coil and encompassing the core to produce therein a non-uniformly distributed alternating magnetic flux, a magnet movably supported within the core for inducing therein a non-uniformly distributed unidirectional magnetic flux, and means for moving the magnet within the core to control the degree of linearization. Means are also provided for varying the distribution of the alternating flux throughout the tubular core to control the amplitude of deflection of the electron beam. In a preferred embodiment of the invention, the ferromagnetic core is of tubular configuration, and the magnet is movably supported within the tubular core.

As employed throughout the specification and the appended claims, the term "unidirectional flux" is descriptive of a time condition rather than a space condition. In other words, a unidirectional magnetic flux is one which is invariant with time for any particular operating condition; the space distribution of a unidirectional magnetic flux may be multidirectional.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figures 1, 2, 3:
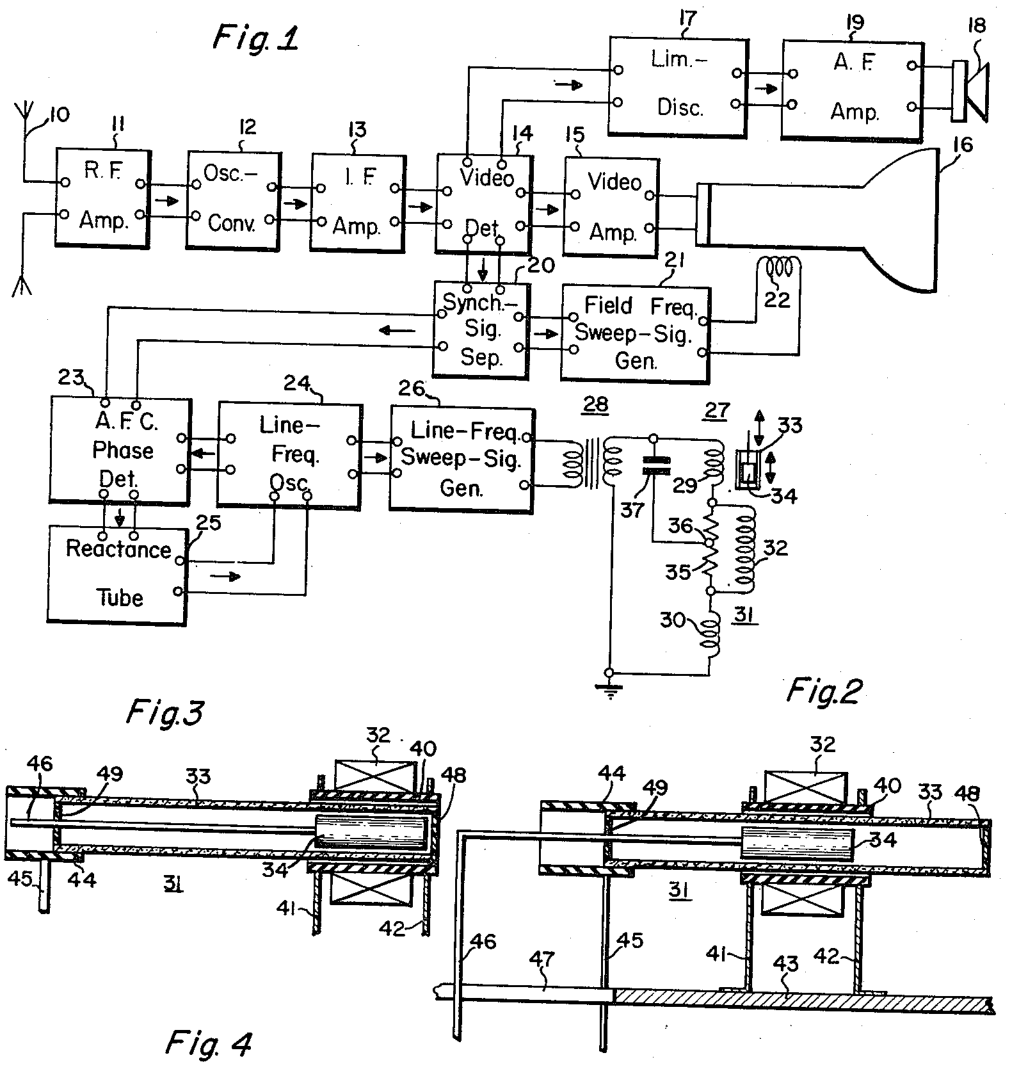
Figure 1 is a schematic circuit diagram of a television receiver embodying a linearizing device constructed in accordance with the present invention.
Figure 2 is an elevational view, partly in cross-section and partly schematic, of a linearizing device constructed in accordance with the invention.
Figures 3 and 4 are views similar to Figure 2 illustrating two different operating conditions of the linearizing device.

As shown in Figure 1, a television receiver embodying the invention may comprise an antenna 10 for receiving a composite television signal. The signal received by antenna 10 is amplified by a radio-frequency amplifier 11 consisting of one or more stages, and the amplified signal is applied to an oscillator-converter 12. The output signal from oscillator-converter 12 is applied to an intermediate-frequency amplifier 13 consisting of one or more stages and coupled to a video detector 14. Video-frequency components of the intermediate-frequency signal, appearing in the output circuit of video detector 14, are amplified by a video amplifier 15, and the amplified video-frequency signal is employed to control the intensity of the electron beam of a cathode-ray tube 16.

Intercarrier sound signals developed by video detector 14 are applied to a limiter-discriminator 17, and the detected output from limiter-discriminator 17 is applied to a loudspeaker 18 or other sound-reproducing device after amplification by means of an audio-frequency amplifier 19.

The detected composite video signal from video detector 14 is also applied to a synchronizing-signal separator 20 which serves to separate the line-frequency and field-frequency synchronizing-signal components from the video-frequency components and from each other. Field-frequency synchronizing-signal pulses from separator 20 are employed to drive a field-frequency sweep-signal generator 21, and the output current from generator 21 is impressed on a field-frequency magnetic-deflection coil 22 associated with cathode-ray tube 16.

Line-frequency synchronizing-signal pulses from separator 20 are applied to an automatic-frequency-control (AFC) phase-detector 23 for comparison with a locally generated signal from a line-frequency oscillator 24. The control signal developed by AFC phase-detector 23 is applied to a reactance tube 25 which controls the operating frequency of oscillator 24. The frequency-controlled output from oscillator 24 is used to drive a line-frequency sweep-signal generator 26 which serves to impress, by means of a sweep-signal output transformer 28, a scanning current of generally sawtooth waveform on a line-frequency magnetic-deflection coil 27 associated with cathode-ray tube 16.

Line-frequency magnetic-deflection coil 27 comprises a pair of series-coupled winding-sections 29 and 30. In accordance with the invention, a linearizing device 31 is effectively coupled in series with magnetic-deflection coil 27 and comprises a coil 32 wound on a tubular high-permeability ferromagnetic core 33. Linearizing device 31 also comprises a permanent magnet 34 movably supported within tubular core 33 for inducing in the core a non-uniformly distributed unidirectional magnetic flux. Magnet 34 is axially movable within core 33 to provide a convenient means for controlling the degree of linearization effected by device 31. Tubular core 33 is made independently movable with respect to coil 32 and magnet 34 to permit the distribution of the alternating flux throughout the core to be varied in order to provide control over the amplitude of deflection of the electron beam of image-reproducing device 16.

Preferably, coil 32 of linearizing device 31 is connected in series between winding-sections 29 and 30 constituting magnetic-deflection coil 27, and in shunt with a damping resistor 35 provided with a center tap 36. A balancing condenser 37 is connected between the high-potential terminal of magnetic-deflection coil 27 and center tap 36 on resistor 35. This arrangement provides inductance and capacity balance between winding-sections 29 and 30 for all inductance values of size and linearity control device 31, as shown and described in detail in the corresponding application of Jack E. Bridges, Serial No. 194,518, filed November 7, 1950, for Television Size Control Circuit, now Patent No. 2,606,306 issued August 5, 1952, and assigned to the present assignee. Alternatively, for the purposes of the present invention, the size and linearity control inductor may be connected in series between the secondary winding of sweep transformer 28 and magnetic-deflection coil 27, or in series with the primary winding of sweep transformer 28, it being essential only that coil 32 is effectively connected in series with magnetic-deflection coil 27.

The construction of size and linearity control device 31 is shown in detail in Figure 2. Coil 32 is wound on a suitable coil form 40 which in turn is supported by means of a pair of brackets 41 and 42 on the chassis 43 of a television receiver or the like. Tubular core 33 is coaxially supported within coil form 40 and is provided at one end with a bushing 44 to which is attached a lever 45 which projects through a slot (not shown) in chassis 43 to permit axial movement of core 33 with respect to coil 32. Core 33 may be constructed of any magnetically soft material such as soft iron, silicon steel or a suitable alloy of nickel, molybdenum, and iron such as that known as Permalloy. When such materials are employed, the core must be laminated or other provision must be made to reduce undesirable eddy-current effects. To avoid the necessity for laminating the core, it is preferred that the core be constructed of a ceramic comprising a mixture of high-resistivity ferromagnetic oxides; such ceramics are commercially known as ferromagnetic spinels or ferrites and are characterized by high permeability together with relatively low saturation flux.

Permanent magnet 34 is movably supported within tubular core 33 and is provided with a suitable actuating member or lever 46 extending through a second slot 47 in chassis 43 to permit axial movement of magnet 34 within core 33. Suitable stop members 48 and 49 are positioned at each end of tubular core 33 to limit the excursion of magnet 34. Magnet 34 is axially polarized and is much shorter than tubular core 33. Preferably, magnet 34 is of an axial length less than half that of core 33; a magnet length substantially equal to the axial length of coil 32 provides excellent results. Magnet 34 may be constructed of any suitable permanently magnetic material although alloys of aluminum, nickel and cobalt, commercially known as Alnico, are preferred for their high retentivity and field strength.

Unidirectional magnetic flux originating at permanent magnet 34 seeks a path of lowest reluctance and, therefore, traverses the small air gap between magnet 34 and tubular core 33. Upon reaching the core, the flux splits in two directions within the core material. By far the largest portion of the unidirectional magnetic flux is concentrated in the portion of the core immediately adjacent magnet 34. The flux density in each end of the tubular core 33 is much lower and of opposite direction than the flux density in the center portion of the core immediately adjacent magnet 34. At the same time, an alternating magnetic flux is induced in tubular core 33 by virtue of the current flowing through coil 32. The alternating magnetic flux loops must all be closed through core 33 and the external space, since no other path for the alternating flux is present. The alternating flux intensity is a maximum in the portion of core 33 encompassed by coil 32 and decreases exponentially toward each end of the core. It is apparent, then, that both the unidirectional magnetic flux induced in core 33 by permanent magnet 34 and the alternating magnetic flux produced in core 33 by virtue of the current flowing in coil 32 are of non-uniform distribution throughout core 33. Moreover, axial movement of either permanent magnet 34 or core 33 results in a change in the distribution of the alternating flux and/or the unidirectional flux throughout core 33.

It has been found that axial movement of the permanent magnet 34 within the tubular core 33 affects primarily the amount of compensation for the curvature of the scanning-current wave or the degree of linearization, and that axial movement of core 33 with respect to magnet 34 and core 32 affects primarily the amplitude of deflection of the electron beam or the size of the reproduced image. However, these are not pure effects, and both linearization and size are concomitantly affected by any change in the distribution of the alternating flux and/or the magnetic flux throughout the core.

Figure 4:
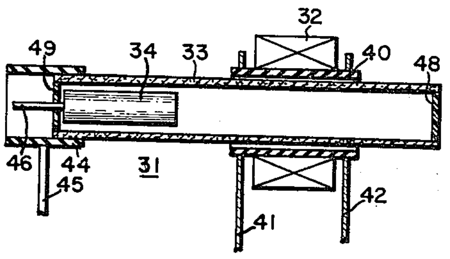

In the view of Figure 3, size and linearity control device 31 is shown adjusted to provide maximum image size with acceptable linearity. With the elements in this position, the maximum unidirectional flux density and the maximum alternating flux density are superimposed one on the other. With the size and linearity control device 31 adjusted as shown in Figure 4, minimum size with acceptable linearity is obtained. With this adjustment the maximum unidirectional flux density and the maximum alternating flux density occur at relatively widely spaced portions of the tubular core.

Figure 5:
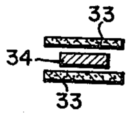
Figures 5, 6 and 7 are cross-sectional views of alternative core configurations which may be employed in the size and linearity control device of the present invention.
Figure 6:
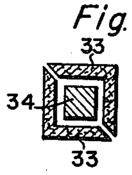
Figure 7:
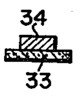

Although it is preferred that core 33 be of a peripherally continuous tubular configuration in order to insure complete shielding of the magnet from the alternating field induced by current flowing in the coil, other core configurations may be employed and are considered within the scope of the invention. For example, bipartite cores of the type shown in cross-section in Figures 5 and 6 are essentially tubular and provide substantially complete shielding. It is also possible to obtain satisfactory results by using a solid core of simple cross-section in conjunction with a magnet which is supported for longitudinal movement along the surface of the core, as shown in cross-section in Figure 7. An arrangement of this latter type provides substantially no shielding between the alternating field established by current flowing in the coil and the magnet; however, by employing a core of ferrite or other high-permeability material, the increase in the current drain of the system occasioned by the lack of shielding may be held to a reasonably small amount.

While it is preferred to employ a permanent magnet 34, it is apparent that similar results may be obtained by substituting an electromagnet. In any event, however, it is necessary in accordance with the invention that the magnet be movable in a longitudinal direction adjacent the core to permit control of the unidirectional-flux distribution throughout the ferromagnetic core.

Thus, the present invention provides a novel device for concomitantly controlling the size and linearity of the reproduced image in a television receiver. The device is simple and inexpensive to construct and is capable of providing substantially complete linearization for any picture size within the operating range. Although a saturable reactor is employed, it is unnecessary to provide a choke or balancing arrangement to isolate the alternating-flux-producing means and the unidirectional-flux-producing means from each other.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a high-permeability ferromagnetic core, a coil effectively connected in series with said magnetic-deflection coil and encompassing said core to produce therein a non-uniformly distributed alternating magnetic flux, a magnet movably supported adjacent said core for inducing therein a non-uniformly distributed unidirectional magnetic flux, and means for moving said magnet longitudinally adjacent said core to control the degree of linearization; and means for varying the distribution of said alternating flux throughout said core to control the amplitude of deflection of said electron beam.

2. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising an essentially tubular high-permeability ferromagnetic core, a coil effectively connected in series with said magnetic-deflection coil and encompassing said core to produce therein a non-uniformly distributed alternating magnetic flux, a magnet movably supported within said core for inducing therein a non-uniformly distributed unidirectional magnetic flux, and means for moving said magnet within said core to control the degree of linearization; and means for varying the distribution of said alternating flux throughout said core to control the amplitude of deflection of said electron beam.

3. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a double-ended tubular high-permeability ferromagnetic core, a coil effectively connected in series with said magnetic-deflection coil and encompassing said core to produce therein a non-uniformly distributed alternating magnetic flux, a magnet shorter than said core and movably supported within said core for inducing therein a non-uniformly distributed unidirectional magnetic flux, and means for moving said magnet within said core to control the degree of linearization; and means for varying the distribution of said alternating flux throughout said core to control the amplitude of deflection of said electron beam.

4. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a double-ended tubular high-permeability ferrite core, a coil effectively connected in series with said magnetic-deflection coil and encompassing said core to produce therein a non-uniformly distributed alternating magnetic flux, a permanent magnet movably supported within said core for inducing therein a non-uniformly distributed unidirectional magnetic flux, and means for moving said magnet within said core to control the degree of linearization; and means for varying the distribution of said alternating flux throughout said core to control the amplitude of deflection of said electron beam.

5. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a peripherally continuous tubular high-permeability ferromagnetic core, a coil effectively connected in series with said magnetic-deflection coil and encompassing said core to produce therein a non-uniformly distributed alternating magnetic flux, an axially polarized magnet slidably supported within said core for inducing therein a non-uniformly distributed unidirectional magnetic flux, and means for moving said magnet in an axial direction within said core to control the degree of linearization; and means for varying the distribution of said alternating flux throughout said core to control the amplitude of deflection of said electron beam.

6. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a tubular high-permeability ferromagnetic core, a second coil effectively connected in series with said magnetic-deflection coil and encompassing said core to produce therein a non-uniformly distributed alternating magnetic flux, a magnet movably supported within said core for inducing therein a non-uniformly distributed unidirectional magnetic flux, and means for moving said magnet within said core to control the degree of linearization; and means for varying the space relation between said second coil and said core to control the amplitude of deflection of said electron beam.

7. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a tubular high-permeability ferromagnetic core, a second coil effectively connected in series with said magnetic-deflection coil and encompassing said core to produce therein a non-uniformly distributed alternating magnetic flux, a magnet movably supported within said core for inducing therein a non-uniformly distributed unidirectional magnetic flux, and means for moving said magnet within said core to control the degree of linearization; and means independent of said magnet-moving means for varying the space relation between said second coil and said core to control the amplitude of deflection of said electron beam.

8. In a deflecting circuit for a cathode-ray tube: a magnetic-deflection coil responsive to an applied scanning current to deflect the electron beam of said cathode-ray tube in accordance with a predetermined scanning pattern; a sweep-signal generator coupled to said magnetic-deflection coil for applying thereto a periodic scanning current of generally sawtooth waveform; a linearizing device comprising a tubular high-permeability ferromagnetic core, a second coil effectively connected in series with said magnetic-deflection coil and encompassing said core to produce therein a non-uniformly distributed alternating magnetic flux, a magnet movably supported within said core for inducing therein a non-uniformly distributed unidirectional magnetic flux; and means for independently varying the space relations between said magnet and said second coil and between said core and said second coil to control the degree of linearization and the amplitude of deflection of said electron beam.

References Cited in the file of this patent

UNITED STATES PATENTS

| | | |
|---|---|---|
| 1,896,510 | Given | Feb. 7, 1933 |
| 2,000,378 | Deisch | May 7, 1935 |
| 2,380,242 | Jewell | July 10, 1945 |
| 2,438,359 | Clapp | Mar. 23, 1948 |
| 2,440,418 | Tourshou | Apr. 27, 1948 |
| 2,451,026 | Friend | Oct. 12, 1948 |
| 2,503,155 | Harvey et al. | Apr. 4, 1950 |
| 2,586,395 | Taylor | Feb. 19, 1952 |
| 2,586,521 | Czeropski et al. | Feb. 19, 1952 |
| 2,598,467 | Van Yzeren | May 27, 1952 |
| 2,598,810 | Lyman | June 3, 1952 |
| 2,612,541 | De Armand | Sept. 30, 1952 |
| 2,627,052 | Helpert et al. | Jan. 27, 1953 |
| 2,656,486 | Giordano | Oct. 20, 1953 |